United States Patent
Reid et al.

(10) Patent No.: US 8,506,222 B2
(45) Date of Patent: Aug. 13, 2013

(54) NUT PLATE ASSEMBLY AND METHODS OF USING THE SAME

(75) Inventors: Leonard Frederick Reid, Renton, WA (US); Timothy Howard Johnson, Seattle, WA (US); James Ryunoshin Ross, Seattle, WA (US)

(73) Assignee: Fatigue Technology, Inc., Seattle, WA (US)

( * ) Notice: Subject to any disclaimer, the term of this patent is extended or adjusted under 35 U.S.C. 154(b) by 308 days.

(21) Appl. No.: 13/054,783

(22) PCT Filed: Jul. 17, 2009

(86) PCT No.: PCT/US2009/051065
§ 371 (c)(1),
(2), (4) Date: Apr. 13, 2011

(87) PCT Pub. No.: WO2010/009442
PCT Pub. Date: Jan. 21, 2010

(65) Prior Publication Data
US 2011/0182692 A1    Jul. 28, 2011

Related U.S. Application Data

(60) Provisional application No. 61/082,098, filed on Jul. 18, 2008.

(51) Int. Cl.
*F16B 39/284* (2006.01)

(52) U.S. Cl.
USPC ........... 411/111; 411/108; 411/112; 411/119; 411/183; 411/204; 411/432; 411/501

(58) Field of Classification Search
USPC ............... 411/108, 111, 112, 119, 174, 176, 411/183, 204, 321, 323, 431, 432, 501, 571, 411/918; 16/2.1, 2.4
See application file for complete search history.

(56) References Cited

U.S. PATENT DOCUMENTS

| | | |
|---|---|---|
| 295,593 A | 3/1884 | Thayer |
| 810,430 A | 1/1906 | Pfluger et al. |

(Continued)

FOREIGN PATENT DOCUMENTS

| | | |
|---|---|---|
| DE | 2203217 | 7/1973 |
| DE | 33 01 849 C1 | 7/1984 |

(Continued)

OTHER PUBLICATIONS

U.S. Appl. No. 09/603,857, filed Jun. 26, 2000, Skinner et al.

(Continued)

*Primary Examiner* — Roberta Delisle
(74) *Attorney, Agent, or Firm* — Seed IP Law Group PLLC

(57) ABSTRACT

A nut plate assembly includes a nut retainer and a bushing for expanding a tubular body of the retainer. The retainer assembly is used to cold work an opening of a workpiece in order to fix the nut retainer assembly relative to the workpiece. A nut member can be snapped into the retainer. A method of installation includes passing a mandrel through the bushing to radially expand the bushing into a tubular body of the retainer. The tubular body is compressed between the workpiece and bushing as the bushing is displaced radially causing corresponding radial displacement of the tubular body. The expanded bushing applies pressure to the tubular body for a desired fit between the nut retainer and workpiece.

20 Claims, 17 Drawing Sheets

(56) References Cited

U.S. PATENT DOCUMENTS

| | | |
|---|---|---|
| 1,081,496 A | 12/1913 | Gillmor |
| 1,106,964 A | 8/1914 | Pahler |
| 1,226,090 A | 5/1917 | Ludlum |
| 1,297,142 A | 3/1919 | Gibbons |
| 1,480,298 A | 1/1924 | Pearson |
| 1,881,867 A | 10/1932 | Nelson |
| 1,979,686 A | 11/1934 | Hall et al. |
| 2,092,358 A | 9/1937 | Robertson |
| 2,146,461 A | 2/1939 | Bettington |
| 2,150,361 A | 3/1939 | Chobert |
| 2,188,596 A | 1/1940 | Hobert |
| 2,275,451 A | 3/1942 | Maxwell |
| 2,357,123 A | 8/1944 | Maxwell |
| 2,385,294 A | 9/1945 | Lowy |
| 2,405,399 A | 8/1946 | Bugg et al. |
| 2,430,554 A | 11/1947 | Bugg et al. |
| 2,433,425 A | 12/1947 | Burckle |
| 2,468,985 A | 5/1949 | Krotz |
| 2,528,180 A | 10/1950 | Roehl |
| 2,583,719 A | 1/1952 | White |
| 2,608,751 A | 9/1952 | Hutton |
| 2,661,182 A | 12/1953 | Kipp |
| 2,672,175 A | 3/1954 | Howard |
| 2,695,446 A | 11/1954 | Meyer |
| 2,700,172 A | 1/1955 | Rohe |
| 2,808,643 A | 10/1957 | Weatherhead, Jr. |
| 2,943,667 A | 7/1960 | Ewing et al. |
| 3,128,999 A | 4/1964 | Schmitt |
| 3,137,887 A | 6/1964 | Mannino et al. |
| 3,149,860 A | 9/1964 | Hallesy |
| 3,164,054 A | 1/1965 | Biesecker |
| 3,244,034 A | 4/1966 | Severdia |
| 3,252,493 A | 5/1966 | Smith |
| 3,345,730 A | 10/1967 | Laverty |
| 3,358,492 A | 12/1967 | Richter |
| 3,399,435 A | 9/1968 | Ackerman |
| 3,434,746 A | 3/1969 | Watts |
| 3,498,648 A | 3/1970 | Hallesy |
| 3,537,163 A | 11/1970 | Steidl |
| 3,566,662 A | 3/1971 | Champoux ............ 72/370 |
| 3,601,771 A | 8/1971 | Dozier |
| 3,674,292 A | 7/1972 | Demler, Sr. |
| 3,677,684 A | 7/1972 | Platz |
| 3,678,535 A * | 7/1972 | Charles ............... 16/2.1 |
| 3,693,247 A | 9/1972 | Brown |
| 3,695,324 A | 10/1972 | Gulistan |
| 3,763,541 A | 10/1973 | Jaffe |
| 3,778,090 A | 12/1973 | Tobin |
| 3,787,945 A | 1/1974 | Pasek et al. |
| 3,820,297 A | 6/1974 | Hurd |
| 3,835,525 A | 9/1974 | King, Jr. |
| 3,875,649 A | 4/1975 | King, Jr. |
| 3,892,121 A | 7/1975 | Champoux et al. ........ 72/393 |
| 3,895,409 A | 7/1975 | Kwatonowski |
| 3,915,052 A | 10/1975 | Ruhl |
| 3,934,325 A | 1/1976 | Jaffe |
| 3,943,748 A | 3/1976 | King, Jr. |
| 3,949,535 A | 4/1976 | King, Jr. |
| 3,997,193 A | 12/1976 | Tsuda et al. |
| 4,003,288 A | 1/1977 | Jeal |
| 4,044,591 A | 8/1977 | Powderley |
| 4,143,580 A | 3/1979 | Luhm |
| 4,164,807 A | 8/1979 | King, Jr. |
| 4,186,787 A * | 2/1980 | Husain ............ 411/183 |
| 4,187,708 A | 2/1980 | Champoux ............ 72/30 |
| 4,237,768 A | 12/1980 | Volkmann |
| 4,249,786 A | 2/1981 | Mahoff |
| 4,295,691 A * | 10/1981 | Rubenthaler ............ 384/297 |
| 4,355,612 A | 10/1982 | Luksch |
| 4,386,515 A | 6/1983 | Starke |
| 4,397,061 A | 8/1983 | Kanzaka |
| 4,405,256 A | 9/1983 | King, Jr. |
| 4,423,619 A | 1/1984 | Champoux ............ 72/393 |
| 4,425,780 A | 1/1984 | Champoux ............ 72/370 |
| 4,447,944 A | 5/1984 | Mohrman |
| 4,471,643 A | 9/1984 | Champoux et al. ............ 72/391 |
| 4,482,089 A | 11/1984 | Lindahl et al. |
| 4,491,358 A | 1/1985 | Choung |
| 4,494,398 A | 1/1985 | Svoboda |
| 4,522,378 A | 6/1985 | Nelson |
| 4,524,600 A | 6/1985 | Champoux et al. ............ 72/391 |
| 4,530,527 A | 7/1985 | Holmberg |
| 4,557,033 A | 12/1985 | Champoux ............ 29/525 |
| 4,557,650 A * | 12/1985 | Molina ............ 411/108 |
| 4,583,388 A | 4/1986 | Hogenhout |
| 4,597,282 A | 7/1986 | Hogenhout |
| 4,640,479 A | 2/1987 | Shely et al. |
| 4,665,732 A | 5/1987 | Hogenhout |
| 4,699,212 A | 10/1987 | Andersson et al. |
| 4,732,518 A * | 3/1988 | Toosky ............ 411/181 |
| 4,755,904 A | 7/1988 | Brick |
| 4,759,237 A | 7/1988 | Fauchet et al. |
| 4,787,793 A | 11/1988 | Harris |
| 4,809,420 A | 3/1989 | Landy et al. ............ 29/523 |
| 4,869,091 A | 9/1989 | Shemeta |
| 4,872,332 A | 10/1989 | Potzas |
| 4,885,829 A | 12/1989 | Landy ............ 29/156.8 R |
| 4,905,766 A | 3/1990 | Dietz et al. |
| 4,934,038 A | 6/1990 | Caudill |
| 4,934,170 A | 6/1990 | Easterbrook et al. ............ 72/370 |
| 4,985,979 A | 1/1991 | Speakman |
| 4,999,896 A | 3/1991 | Mangus et al. |
| 5,038,596 A | 8/1991 | Noonan et al. |
| 5,069,586 A | 12/1991 | Casey |
| 5,083,363 A | 1/1992 | Ransom et al. ............ 29/523 |
| 5,093,957 A | 3/1992 | Do |
| 5,096,349 A | 3/1992 | Landy et al. ............ 411/108 |
| 5,103,548 A | 4/1992 | Reid et al. ............ 29/507 |
| 5,110,163 A | 5/1992 | Benson et al. |
| 5,127,254 A | 7/1992 | Copple et al. ............ 72/370 |
| 5,129,253 A | 7/1992 | Austin et al. |
| 5,207,461 A | 5/1993 | Lasko |
| 5,218,854 A | 6/1993 | Jarzebowicz et al. |
| 5,245,743 A | 9/1993 | Landy et al. ............ 29/523 |
| 5,253,773 A | 10/1993 | Choma et al. |
| 5,305,627 A | 4/1994 | Quincey et al. ............ 72/370 |
| 5,341,559 A | 8/1994 | Reid et al. ............ 29/523 |
| 5,380,111 A | 1/1995 | Westrom |
| 5,380,136 A | 1/1995 | Copple et al. ............ 411/183 |
| 5,390,808 A | 2/1995 | Choma et al. |
| 5,405,228 A | 4/1995 | Reid et al. ............ 411/183 |
| 5,433,100 A | 7/1995 | Easterbrook et al. ............ 72/391.2 |
| 5,466,016 A | 11/1995 | Briody et al. |
| 5,468,104 A | 11/1995 | Reid et al. |
| 5,478,122 A | 12/1995 | Seabra |
| 5,496,140 A | 3/1996 | Gossmann et al. |
| 5,607,194 A | 3/1997 | Ridenour |
| 5,609,434 A | 3/1997 | Yehezkieli et al. |
| 5,713,611 A | 2/1998 | Kurimoto et al. |
| 5,722,312 A | 3/1998 | Kristensen |
| 5,806,173 A | 9/1998 | Honma et al. |
| 5,885,318 A | 3/1999 | Shimizu et al. |
| 5,943,898 A | 8/1999 | Kuo |
| 5,947,326 A | 9/1999 | O'Hern et al. |
| 6,058,562 A | 5/2000 | Satou et al. |
| 6,077,010 A | 6/2000 | Reid et al. ............ 411/107 |
| 6,131,964 A | 10/2000 | Sareshwala |
| 6,183,180 B1 | 2/2001 | Copple et al. |
| 6,217,082 B1 | 4/2001 | Orcutt et al. |
| 6,266,991 B1 | 7/2001 | Kuo |
| 6,289,577 B1 | 9/2001 | Tanaka et al. |
| 6,325,582 B1 | 12/2001 | Sadri et al. |
| 6,328,513 B1 | 12/2001 | Niwa et al. |
| 6,347,663 B1 | 2/2002 | Hunzinger et al. |
| 6,487,767 B1 | 12/2002 | Reid et al. |
| 6,488,460 B1 | 12/2002 | Smith et al. |
| 6,499,926 B2 | 12/2002 | Keener |
| 6,537,005 B1 | 3/2003 | Denham |
| 6,623,048 B2 | 9/2003 | Castel et al. |
| 6,651,301 B1 | 11/2003 | Liu |
| 6,705,149 B2 | 3/2004 | Cobzaru et al. |
| 6,761,380 B2 | 7/2004 | Pachciarz et al. |
| 6,773,039 B2 | 8/2004 | Muenster et al. |
| 6,796,765 B2 | 9/2004 | Kosel et al. |

| | | |
|---|---|---|
| 6,826,820 B2 | 12/2004 | Denham et al. |
| RE38,788 E | 9/2005 | Satou et al. |
| 6,990,722 B2 | 1/2006 | Reid et al. |
| 7,024,908 B2 | 4/2006 | Poast et al. ............... 72/391.2 |
| 7,024,909 B2 | 4/2006 | Cobzaru et al. |
| 7,047,596 B2 | 5/2006 | Sucic et al. |
| 7,059,816 B2 | 6/2006 | Toosky ......................... 411/181 |
| 7,100,264 B2 | 9/2006 | Skinner et al. ................ 29/523 |
| 7,156,051 B2 | 1/2007 | Lorton et al. ................ 119/437 |
| 7,273,338 B2 | 9/2007 | Summerlin |
| 7,325,796 B2 | 2/2008 | Moreland |
| 7,375,277 B1 | 5/2008 | Skinner et al. ................ 174/18 |
| 7,406,777 B2 | 8/2008 | Grover et al. |
| 7,448,652 B2 | 11/2008 | Poast et al. |
| 7,509,829 B2 | 3/2009 | Johnson |
| 7,575,404 B2 * | 8/2009 | Toosky et al. ................. 411/113 |
| 7,617,712 B2 | 11/2009 | Glenn |
| 7,641,430 B2 | 1/2010 | Johnson et al. ............... 411/132 |
| 7,695,226 B2 | 4/2010 | March et al. |
| 7,926,318 B2 | 4/2011 | Glenn |
| 7,926,319 B2 | 4/2011 | Johnson |
| 8,069,699 B2 | 12/2011 | Glenn et al. |
| 8,191,395 B2 | 6/2012 | Glenn |
| 2003/0110618 A1 | 6/2003 | Magnuson |
| 2004/0111864 A1 | 6/2004 | Skinner et al. |
| 2004/0213492 A1 | 10/2004 | Kim et al. |
| 2005/0000081 A1 | 1/2005 | Reid et al. |
| 2005/0025601 A1 | 2/2005 | Poast et al. |
| 2006/0045649 A1 | 3/2006 | Johnson et al. |
| 2006/0251490 A1 | 11/2006 | Kleinman et al. |
| 2007/0048107 A1 | 3/2007 | Johnson et al. |
| 2007/0110541 A1 | 5/2007 | Rawlins et al. |
| 2007/0224016 A1 | 9/2007 | Toosky et al. |
| 2007/0289351 A1 | 12/2007 | Glenn |
| 2008/0005887 A1 | 1/2008 | Glenn et al. |
| 2008/0034831 A1 | 2/2008 | Glenn |
| 2008/0066518 A1 | 3/2008 | Glenn et al. |
| 2008/0101887 A1 * | 5/2008 | Toosky et al. ................. 411/71 |
| 2008/0250603 A1 | 10/2008 | Skinner et al. |
| 2009/0304315 A1 | 12/2009 | Johnson |
| 2010/0000280 A1 | 1/2010 | Reid et al. |
| 2010/0260572 A1 | 10/2010 | Wehrmeister et al. |

FOREIGN PATENT DOCUMENTS

| | | |
|---|---|---|
| DE | 3545554 A1 | 7/1987 |
| DE | 89 01 317 U1 | 3/1989 |
| EP | 0 054 592 A1 | 6/1982 |
| EP | 0 140 516 A1 | 5/1985 |
| EP | 0 248 122 A2 | 12/1987 |
| EP | 0 785 366 A1 | 7/1997 |
| EP | 0 891 007 A1 | 1/1999 |
| EP | 0 945 919 B1 | 9/1999 |
| EP | 1166951 A1 | 1/2002 |
| EP | 1 202 458 A1 | 5/2002 |
| EP | 1525952 A1 | 4/2005 |
| EP | 1611976 A1 | 1/2006 |
| EP | 1 872 895 A2 | 1/2008 |
| EP | 1 903 221 A2 | 3/2008 |
| FR | 2645052 | 10/1990 |
| GB | 593607 | 10/1947 |
| GB | 1395009 | 5/1975 |
| GB | 2 239 917 A | 7/1991 |
| JP | 57137031 | 8/1982 |
| JP | 60238046 A | 11/1985 |
| JP | 61157846 | 7/1986 |
| JP | 10-274366 | 10/1998 |
| JP | 10-299735 | 11/1998 |
| JP | 2001-177964 | 6/2001 |
| SU | 632463 | 11/1978 |
| WO | 8400120 | 1/1984 |
| WO | 91/11273 A1 | 8/1991 |
| WO | 00 28221 A2 | 5/2000 |
| WO | 02059489 A1 | 8/2002 |
| WO | 2006132936 A1 | 12/2006 |
| WO | 2007082077 A1 | 7/2007 |
| WO | 2007121932 A1 | 11/2007 |
| WO | 2010/009442 A2 | 1/2010 |

OTHER PUBLICATIONS

Merriam Webster's Collegiate Dictionary, Tenth Edition, 1997, p. 154. (1).

* cited by examiner

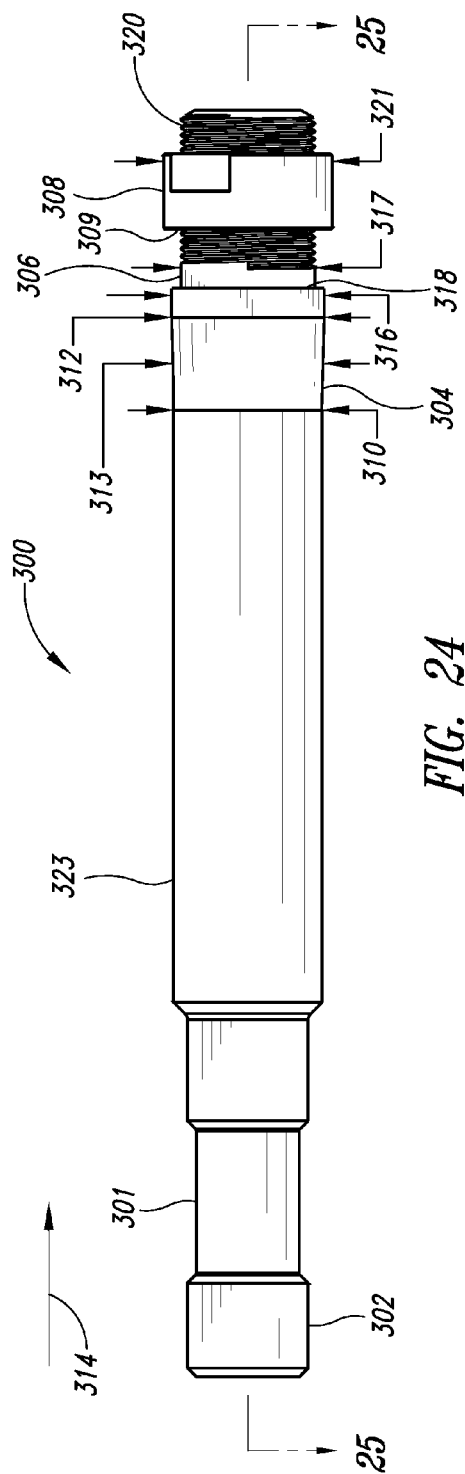
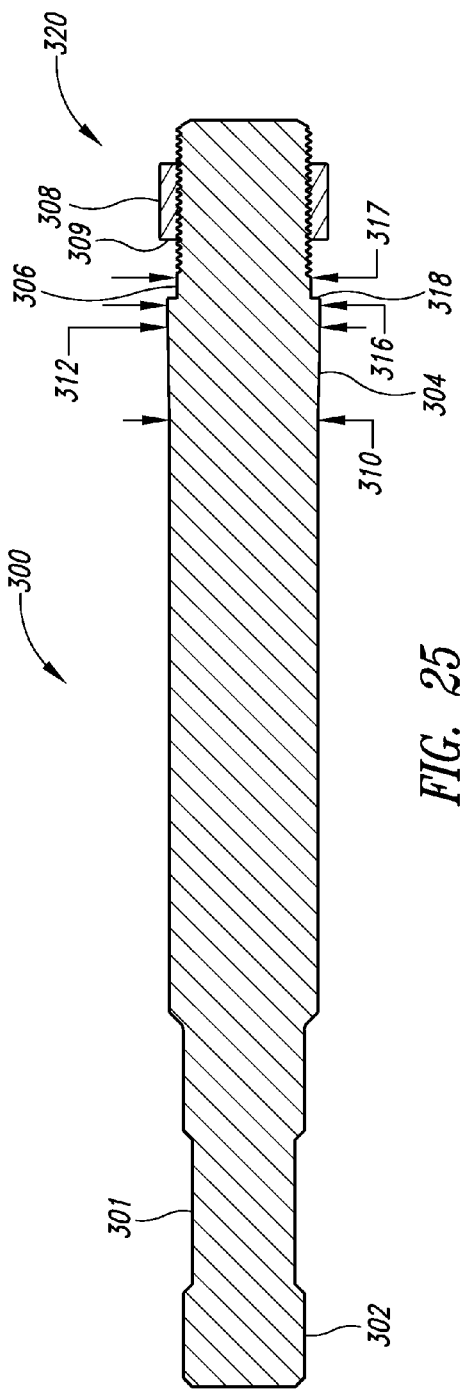
FIG. 24
FIG. 25

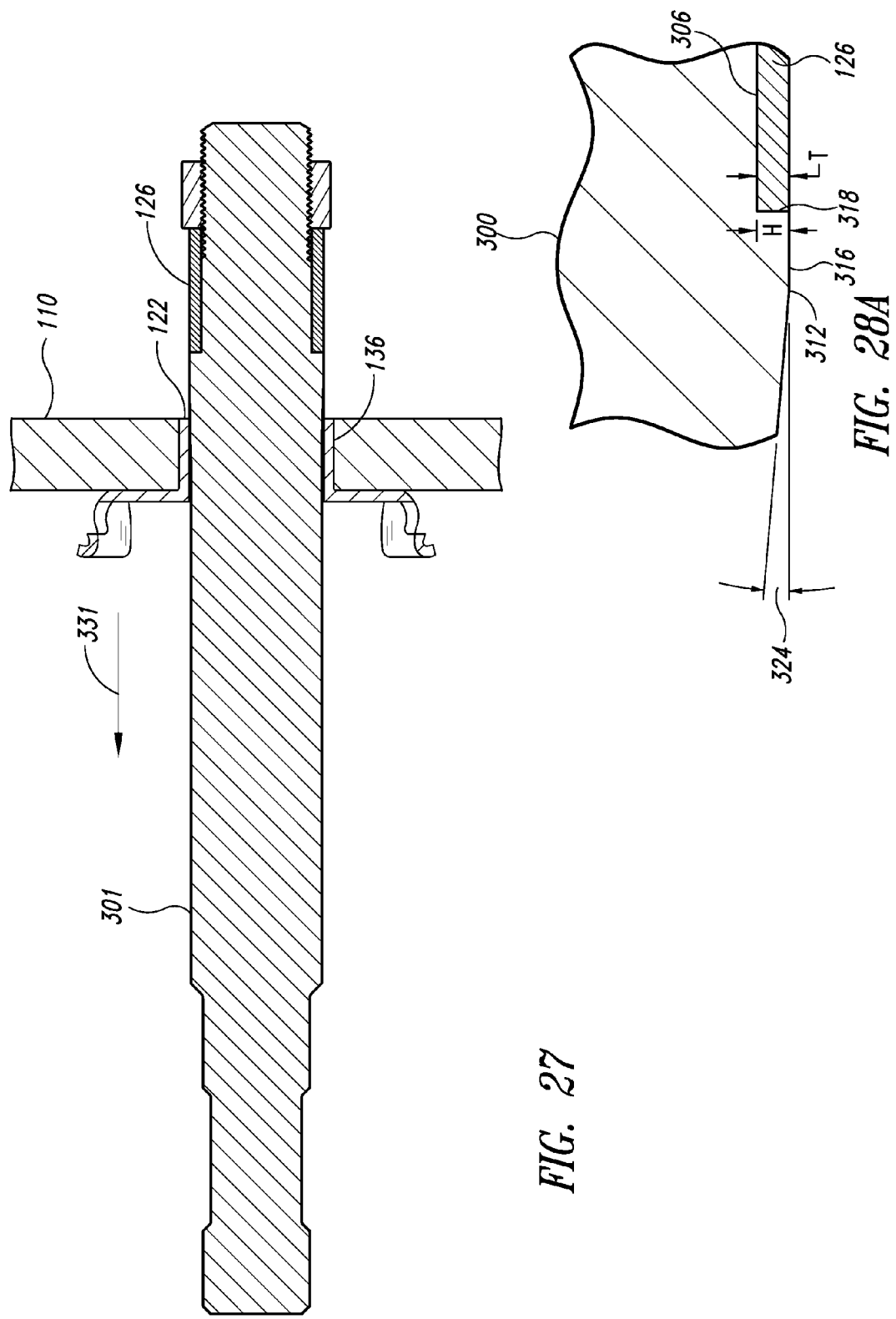

NUT PLATE ASSEMBLY AND METHODS OF USING THE SAME

CROSS-REFERENCE TO RELATED APPLICATION

This application claims the benefit under 35 U.S.C. §119(e) of U.S. Provisional Patent Application No. 61/082,098 filed Jul. 18, 2008. This provisional application is incorporated herein by reference in its entirety.

BACKGROUND

1. Technical Field

This disclosure generally relates to nut plate assemblies and methods of using the same.

2. Description of the Related Art

Rivetless nut plates are often installed into structural workpieces in order to couple components to the workpieces. Conventional nut plates may include a bracket and a nut coupleable to the bracket. The nut can receive an externally threaded component (e.g., a bolt or a screw) after the bracket has been secured to the workpiece. When the installed nut plate supports an attached component, a flat face of the bracket can bear against the workpiece to help distribute loads to the workpiece to prevent excessive stresses in the workpiece.

One type of conventional bracket for a nut plate has an expandable one-piece sleeve that a user can insert into an opening of the workpiece. The sleeve is then displaced radially against a tubular surface of the workpiece that defines the workpiece opening. Unfortunately, the one-piece sleeve has a fixed longitudinal length rendering the bracket unsuitable for installation in workpiece openings having longitudinal lengths that are significantly different from the length of the sleeve. A large variety of brackets having sleeves of different dimensions must therefore be kept in stock to install nut plates in different sized openings.

Conventional installation techniques involve expanding the sleeves by swaging the sleeve into the workpiece such that the bracket is fixedly coupled to the structural workpiece. For example, a mandrel moving through a passageway of the sleeve can expand the sleeve to create an interference fit between the sleeve and the workpiece. The installed nut plate bracket resists torques and axial push/pull-out. In addition, the expansion of the sleeve may induce compressive residual stresses into the workpiece material surrounding the opening. If the sleeve extends through a portion of the opening, compressive stresses may be induced only along that portion of the opening. Thus, residual stress may not be induced throughout the length of the opening resulting in a workpiece that is susceptible to fatigue failures.

BRIEF SUMMARY OF THE DISCLOSURE

Some embodiments disclosed herein include a nut plate assembly for connecting two or more components. The installed nut plate assembly resists a wide range of static loads, dynamic loads, and combinations thereof. The nut plate assembly includes a retainer assembly with a tubular section, which includes an expandable member and an outer tubular body that surrounds the expandable member. The expandable member and outer tubular body cooperate to achieve a desired fit with the workpiece.

In some embodiments, the nut plate assembly includes an expandable member and a nut retainer. The expandable member and a tubular body of the nut retainer cooperate to fixedly couple the nut retainer to a workpiece. The nut retainer retains a nut member that provides threads for receiving an externally threaded portion of another component. Loads can be applied to the nut retainer via the nut member while the nut retainer minimizes, limits, or substantially eliminates unwanted damage to the component. In some embodiments, the expandable member extends through the tubular body and is used to radially-expand the tubular body to provide a desired grip length based on a thickness of the workpiece.

The tubular body of the nut retainer and the expandable member are radially expanded together. For example, the expandable member in the form of a bushing can be radially expanded by a mandrel to radially expand the tubular body of the nut retainer and the workpiece. The radially-expanded expandable member, in some embodiments, achieves high levels of expansion in the tubular body of the retainer, which in turn causes expansion of the workpiece to improve fatigue performance of the workpiece.

In some embodiments, an assembly for retaining a nut member comprises a nut retainer and a bushing. The nut retainer includes a nut retaining section and an expandable tubular body connected to the nut retaining section. The nut retaining section includes an abutment portion configured to contact a workpiece when the expandable tubular body is positioned in an opening of the workpiece. The expandable tubular body includes a body inner surface that surrounds a tubular body passageway and that defines a tubular body inner perimeter. The bushing includes a bushing outer surface defining a first outer perimeter and a bushing inner surface at least partially surrounding a bushing passageway. The first outer perimeter of the bushing is substantially equal to or smaller than the body inner perimeter. The bushing passageway is adapted to receive a mandrel capable of radially expanding the bushing and the tubular body when the tubular body circumferentially surrounds the bushing so as to produce an interference fit between the tubular body and the workpiece and an interference fit between the bushing outer surface and the body inner surface.

In some embodiments, an installation comprises a workpiece and a retainer. The workpiece includes a first side, a second side, and an opening extending between the first side and the second side. The opening has a longitudinal length. The retainer assembly includes a tubular section that has been expanded to provide radial expansion along at least most of the longitudinal length of the opening of the workpiece. In some embodiments, at least 50% of the longitudinal length of the opening of the workpiece is expanded. In some embodiments, at least 75% of the longitudinal length of the opening of the workpiece is expanded to significantly increase fatigue performance of the workpiece. In some embodiments, at least 90% of the longitudinal length of the opening of the workpiece is expanded to significantly increase fatigue performance of material of the workpiece proximate to the first and second side.

The retainer assembly, in some embodiments, includes a nut and a retainer including a nut retaining section and an expanded tubular body. The nut retaining section is adapted to receive and retain the nut and to physically contact the first side of the workpeice. The expanded tubular body extends through at least a portion of the opening and has a passageway. The retainer assembly further includes an expanded bushing that extends through the passageway of the tubular body and has a bushing passageway. The tubular section of the retainer assembly includes the tubular body of the retainer and the bushing.

In some embodiments, a method of installation includes positioning a tubular body of a nut retainer in an opening of a workpiece such that a nut retaining section of the retainer is on a first side of the workpiece and the tubular body extends away from the nut retaining section towards a second side of the workpiece opposing the first side. The nut retaining section is adapted to receive and hold a nut member. A bushing is positioned in a passageway of the tubular body of the nut retainer. The bushing is expanded using a mandrel to cause radial expansion of both the tubular body and a surface of the workpiece that defines the opening.

In yet other embodiments, a method of installation includes positioning a nut retainer in an opening of the workpiece. A portion of the retainer is on one side of the workpiece and another portion of the retainer is on the other side of the workpiece and/or within the opening. At least a portion of the nut retainer can receive and hold a nut member. A bushing is positioned in a passageway of the nut retainer. The bushing can be expanded using the mandrel so as to cause real expansion of both the tubular body and a surface of the workpiece that defines the opening.

BRIEF DESCRIPTION OF THE SEVERAL VIEWS OF THE DRAWINGS

In the drawings, identical reference numbers identify similar elements or acts. The sizes and relative positions of elements in the drawings are not necessarily drawn to scale.

FIG. 24 is a side elevational view of a mandrel assembly for installing a nut plate assembly, according to one illustrated embodiment.

FIG. 25 is a cross-sectional view of the mandrel assembly of FIG. 24 taken along a line 25-25.

FIG. 27 is a cross-sectional view of the mandrel assembly of FIG. 26 showing an expandable member about to be moved into the radially expanded tubular body of a nut retainer.

FIGS. 28A-28E are detailed views of one region of various mandrels carrying expandable members.

DETAILED DESCRIPTION OF THE DISCLOSURE

In the following description, certain specific details are set forth in order to provide a thorough understanding of various embodiments of the invention. However, one skilled in the art will understand that the invention may be practiced without these details. The assemblies and processes disclosed herein can be used to couple together a desired number of components. The components can include, without limitation, workpieces, connectors, mounting components, and the like. The terms "proximal" and "distal" are used to describe the illustrated embodiments and are used consistently with the description of non-limiting exemplary applications. The terms proximal and distal are used in reference to the user's body when the user operates an installation system, unless the context clearly indicates otherwise.

Unless the context requires otherwise, throughout the specification and claims which follow, the word "comprise" and variations thereof, such as, "comprises" and "comprising" are to be construed in an open, inclusive sense, that is as "including, but not limited to."

As used in this specification and the claims, the singular forms "a," "an," and "the" include plural referents unless the content clearly dictates otherwise. Thus, for example, reference to a nut plate assembly that includes "a bushing" includes a nut plate assembly with a single bushing or nut plate assembly with two or more bushings, or both. It should also be noted that the term "or" is generally employed in its sense including "and/or" unless the context clearly dictates otherwise.

Figure 1:
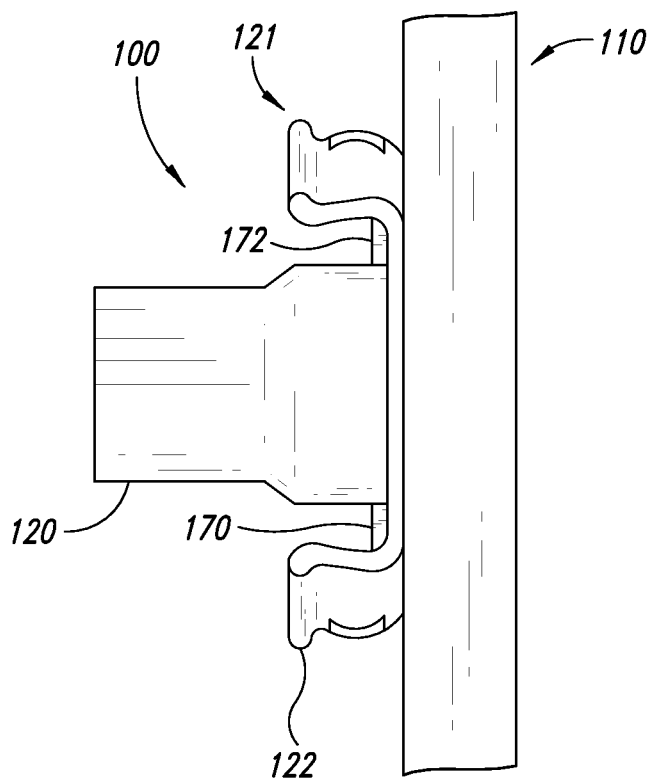
FIG. 1 is a side elevational view of a nut plate assembly installed in a workpiece, according to one illustrated embodiment.
Figure 2:
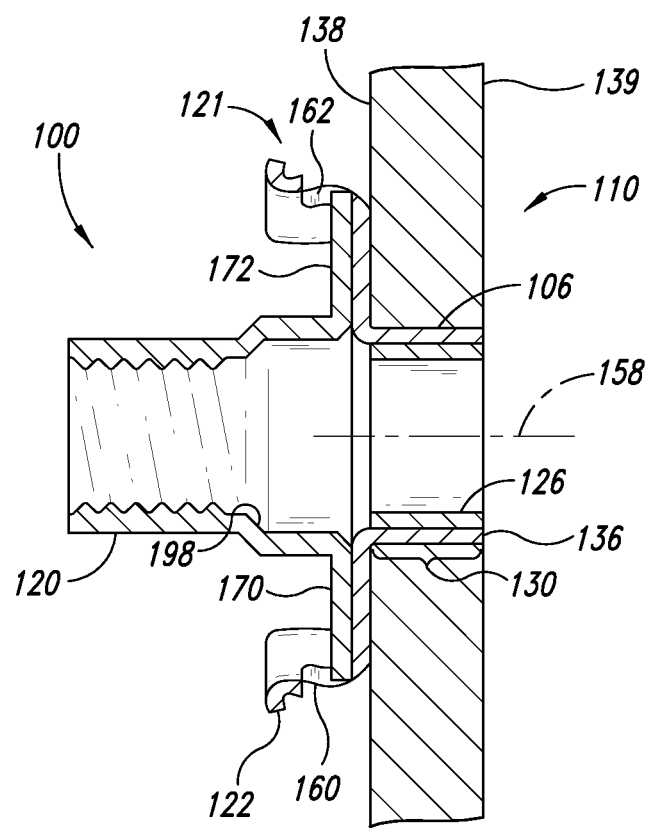
FIG. 2 is a cross-sectional view of the nut plate assembly and workpiece of FIG. 1.
Figure 3:
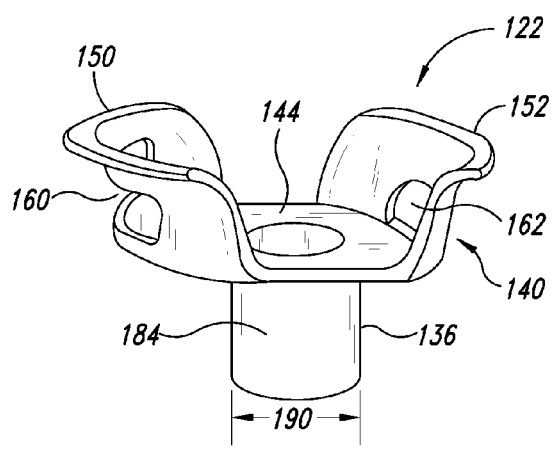
FIG. 3 is an isometric view of a nut retainer of a nut plate assembly, according to one illustrated embodiment.

FIGS. 1 and 2 show a nut plate assembly 100 installed within an opening 106 of a workpiece 110. The nut plate assembly 100 includes a nut member 120 and a retainer assembly 121 fixedly coupled to the workpiece 110. The retainer assembly 121 includes a nut retainer 122 adapted to releasably hold the nut member 120 and an expandable member 126, illustrated as a bushing.

The illustrated nut plate assembly 100 has a multi-piece tubular section 130 that includes the bushing 126 and a tubular body 136 of the nut retainer 122 circumferentially surrounding the bushing 126. The tubular section 130 has been expanded to fixedly couple the nut plate assembly 100 to the workpiece 110. A mounting component (e.g., a screw, bolt, threaded member, and the like) can be threadably coupled to the nut member 120 such that the mounting component is coupled to the workpiece 10 by the nut plate assembly 100.

The nut plate assembly 100 can be installed into various types of workpieces. As used herein, the term "workpiece" is broadly construed to include, without limitation, a parent structure, such as a thin sheet of metal, a structural component, etc., having at least one opening suitable for receiving at least a portion of the nut plate assembly 100. The opening can be a through-hole (with or without back side access) or other type of hole. The illustrated opening 106 of FIG. 2 extends between a first side 138 and a second side 139 of the workpiece 110. In some embodiments, the workpiece 110 is a structural workpiece, such as a bulkhead, a fuselage, a tank (e.g., fuel tank), an engine, or other structural component of an aircraft. If the workpiece 110 is a multi-component structure, the nut plate assembly 100 can hold the components of the structure together with a desired clamp-up force. Multi-component structures include, without limitation, a stack of plates, multi-layer laminates, and the like. The illustrated structural workpiece 110 of FIGS. 1 and 2 can comprise, without limitation, one or more metals (e.g., steel, aluminum, titanium, and the like), polymers, plastics, composites, or other materials suitable for engaging one or more of the components of the nut plate assembly 100.

Figure 4:
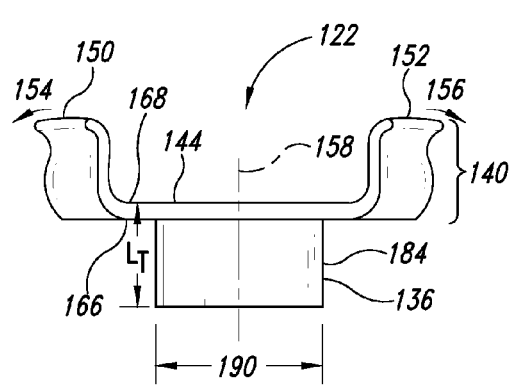
FIG. 4 is a side elevational view of the nut retainer of FIG. 3, according to one illustrated embodiment.
Figure 5:
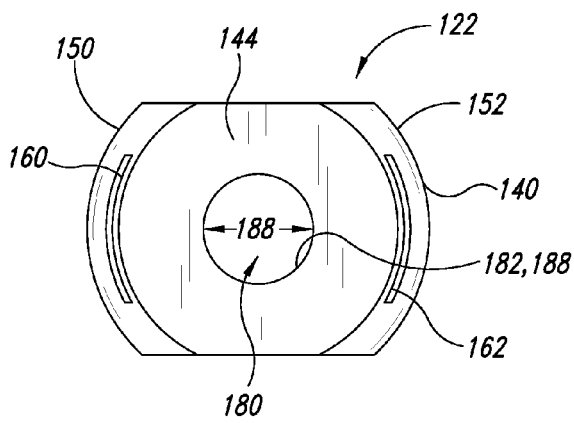
FIG. 5 is a top plan view of the nut retainer of FIG. 3, according to one illustrated embodiment.
Figure 6:
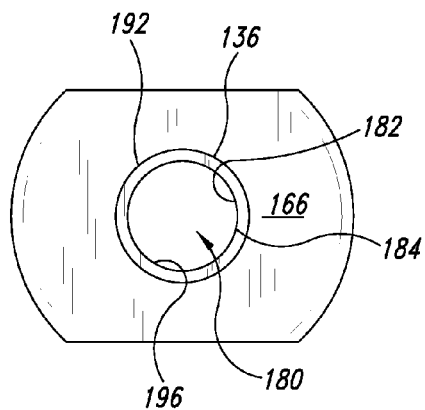
FIG. 6 is a bottom view of the nut retainer of FIG. 3, according to one illustrated embodiment.

FIGS. 3-6 show the nut retainer 122 that includes a nut retaining section 140 and the tubular body 136. The nut retaining section 140 has a generally U-shaped profile, as illustrated in FIG. 4, and includes an abutment portion 144 configured to contact the workpiece 110 when the tubular body 136 is within the workpiece opening 106, as shown in FIG. 2. The abutment portion 144 can be in the form of a plate that includes a first face 166 and a second face 168 opposing the first face 166. The illustrated first face 166 is generally planar to provide a relatively large surface area for physically contacting the workpiece 110. The first face 166 can lay generally flat along the workpiece 110.

The illustrated retaining section 140 includes a pair of flexible retention elements 150, 152 extending away from the abutment portion 144 and partially surrounding a longitudinal axis 158 of the tubular body 136. The retention elements 150, 152 include apertures 160, 162, respectively. The nut member 120 can be inserted between the retention elements 150, 152 to spread the retention elements 150, 152 outwardly, as indicated by the arrows 154, 156 of FIG. 4, such that elongated members 170, 172 of the nut member 120 move into the apertures 160, 162, respectively. FIG. 2 shows the elongate members 170, 172 positioned within the apertures 160, 162, respectively.

Referring again to FIGS. 3-6, the tubular body 136 includes a tubular body passageway 180, an inner surface 182 surrounding the passageway 180, and an outer surface 184 opposing the inner surface 182. The inner surface 182 defines an inner perimeter 188, and the outer surface 184 defines an outer perimeter 190. The outer perimeter 190 can be sized to closely fit within the opening 106 of the workpiece 110 before the tubular body 136 is radially expanded. For example, a clearance fit with a minimal amount of clearance, a slight clearance fit, or the like can be formed by the outer surface 184 and the workpiece 110.

The tubular body 136 can have various cross-sectional profiles, including, without limitation, a circular profile, a polygonal profile, an elliptical profile, or the like. The tubular body 136 shown in FIG. 6 has an approximately circular profile that is substantially geometrically congruent to the profile of the opening 106.

Various types of manufacturing processes can be used to make the nut retainer 122. For example, stamping processes, machining processes, bending processes, and the like can be employed. In some embodiments, a flat sheet of metal is cut (e.g., die cut) into a desired configuration. The cut piece of metal is then stamped to form the illustrated nut retaining section 140. The nut retaining section 140 is then coupled to the tubular body 136. The tubular body 136 can be made of a material, or combination of materials, that permits radial expansion. The tubular body 136 can experience plastic deformation to form a permanent interference fit with the workpiece 110 and elastic deformation to contract onto and form a permanent interference fit with the bushing 126. The expanded tubular body 136, in some embodiments, radially contracts (e.g., elastically contracts) onto the bushing 126. In some embodiments, the tubular body 136 experiences only permanent deformation. Such embodiments are well suited for the simultaneous expansion of the bushing 126 and the tubular body 136, as discussed in connection with FIGS. 14-18.

Figure 7:
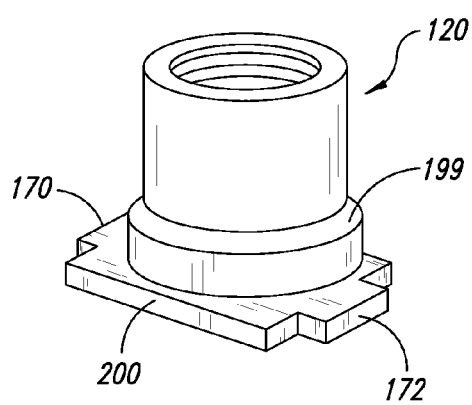
FIG. 7 is an isometric view of a nut member of a nut plate assembly, according to one illustrated embodiment.
Figure 8:
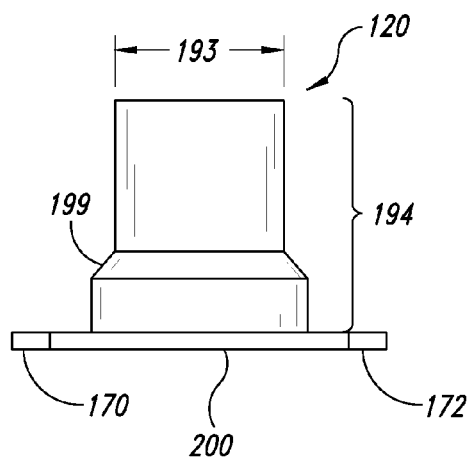
FIG. 8 is a side elevational view of the nut member of FIG. 7, according to one illustrated embodiment.
Figure 9:
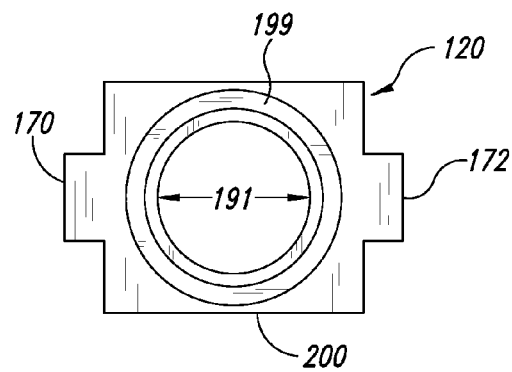
FIG. 9 is a top plan view of the nut member of FIG. 7, according to one illustrated embodiment.
Figure 10:
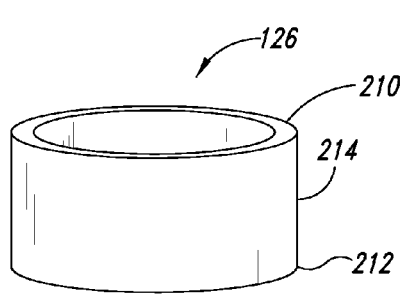
FIG. 10 is a perspective view of an expandable member of a nut plate assembly, according to one illustrated embodiment.
Figure 11:
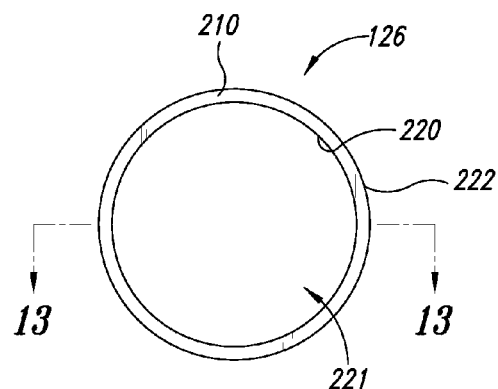
FIG. 11 is a top plan view of the expandable member of FIG. 10.
Figure 12:
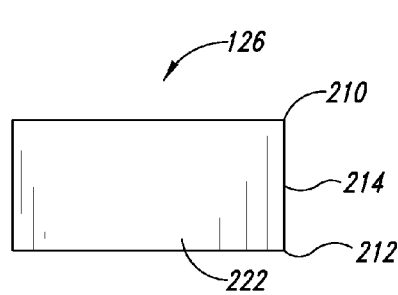
FIG. 12 is a side elevational view of the expandable member of FIG. 10.
Figure 13:
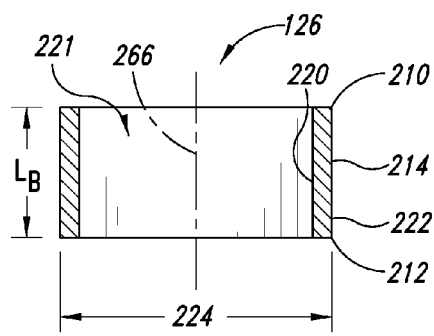
FIG. 13 is a cross-sectional view of the expandable member of FIG. 11 taken along a line 13-13.

FIGS. 7-9 show the nut member 120 having an inner perimeter 191 and an outer perimeter 193. In some embodiments, the inner perimeter 191 is at least partially threaded for threadably coupling to another component. In other embodiments, the inner perimeter 191 is configured to receive a non-threaded component. The nut member 120 may include one or more fixation elements, such as fasteners, set screws, and the like, to fixedly retain another component. The nut member 120 can also include an outer shoulder 199 that can engage a cap or the like. For example, the outer perimeter 193 can be sized such that a cap can be inserted over the nut member 120. FIG. 2 shows an inner shoulder 198 of the nut member 120 that can act as an axial restraint for the mandrel used to install the nut plate assembly 100.

In some embodiments, including the illustrated embodiment of FIGS. 7-9, the nut member 120 has a base 200 that includes the elongate members 170, 172, illustrated as generally rectangular tabs. The shape, size, and number of the elongate members can be selected based on the desired interaction between the nut member 120 and the nut retainer 122. When the nut member 120 is coupled to the retainer 122, the base 200 can be held against the face 168 to reduce, limit, or substantially eliminate relative movement between the base 200 and the retainer 122.

The illustrated nut member 120 can be snapped into the retainer 122 of FIGS. 1 and 2 before, after, or during the installation of the retainer 122. Additionally, the nut member 120 can be removed from the retainer 122, if needed or desired. The retention elements 150, 152 can be deflected outwardly until the elongate members 170, 172 are released from the retention elements 150, 152. The nut member 120 is then moved away from the retainer 122. Another nut member, or other type of component, can then be installed in the retainer 122.

Other types of nut members can be utilized with the nut retainer 122. For example, one-piece or multi-piece nut members can be incorporated into the nut plate assembly 100. U.S.

application Ser. No. 11/445,951, which is incorporated by reference herein in its entirety, discloses such nut members.

Referring to FIGS. 10-13, the expandable member 126 is in the form of a bushing. As used herein, the term "expandable member" is a broad term and includes, but is not limited to, a bushing, a fastener, a structural expandable member (e.g., an expandable member that is incorporated into a structural workpiece), or other structures that are suitable for coupling to a workpiece. The bushing 126 can be expanded from a first configuration to a second configuration. In some embodiments, for example, the bushing 126 is radially expanded from an initial configuration to a second configuration in order to form an interference fit with a structural workpiece or a nut retainer, or both, as well as other components, if needed or desired. The term "expandable member" refers to a member both in a pre-expanded state and post-expanded state, unless the context clearly dictates otherwise. Various types of expansion processes can be employed to expand the expandable members. In a cold expansion process, for example, the expandable member is radially expanded without appreciably raising the temperature of the expandable member to produce residual stresses in the workpiece to enhance fatigue performance. The residual stresses are preferably compressive stresses that can minimize, limit, inhibit, or prevent crack initiation and/or crack propagation. As noted above, expandable members can be in the form of bushings. A bushing may be, without limitation, a sleeve (including a split sleeve), a tubular member (with or without flanges), and the like. The bushing may have various features, such as coatings, liners, seating features (e.g., flanges) and the like. As used herein, the term "expanding" and variations thereof (e.g., expandable, expanded, etc,) are broad terms and include, but are not limited to, spreading, swaging, drawing, radially expanding, displacing, deforming, or other ways of displacing at least a portion of a component.

The bushing 126 includes a first end 210, a second end 212 opposing the first end 210, and a body 214 that extends between the first and second ends 210, 212. The bushing 126 further includes an inner surface 220 defining a passageway 221 and an outer surface 222. The outer surface 222 includes an outer perimeter 224 that is sized to closely fit (e.g., to provide a clearance fit with a minimal amount of clearance, a slight clearance fit, or the like) within the tubular body 136 of the retainer 122. The bushing 126 can thus be easily inserted into the tubular body 136 and then expanded.

Figure 14:
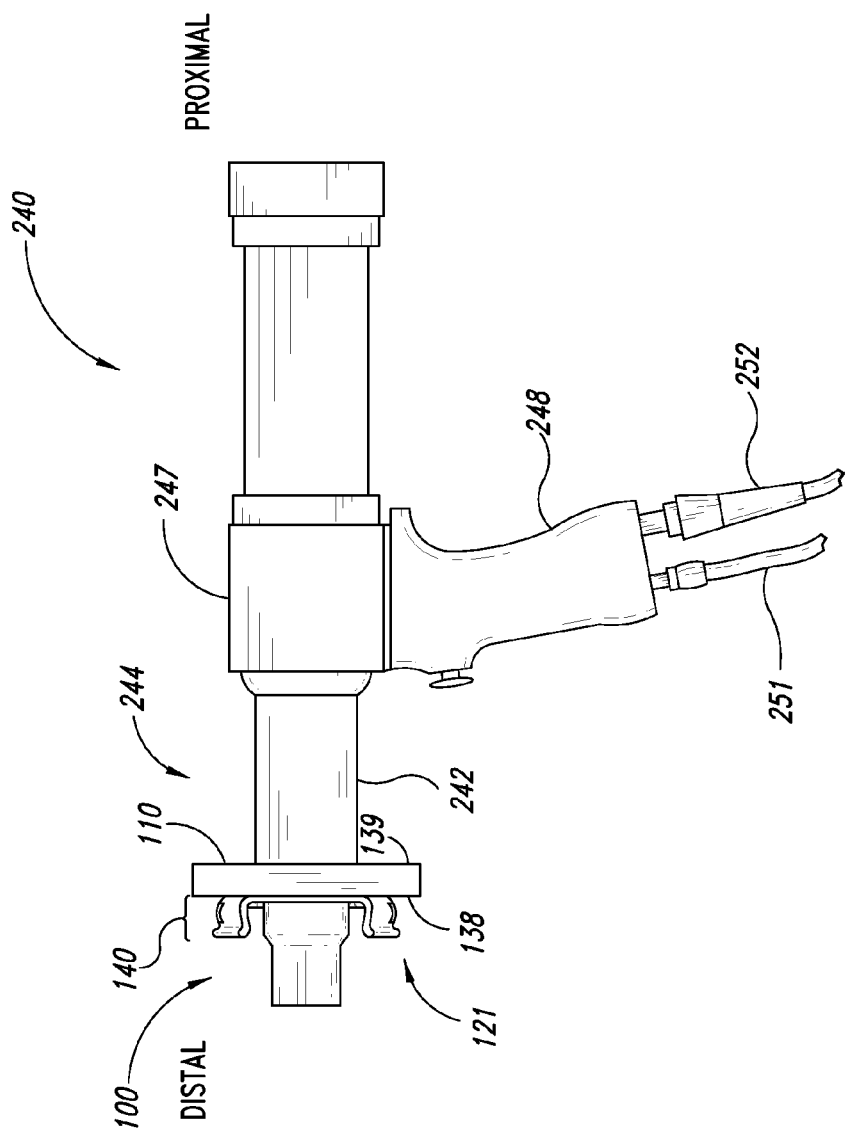
FIG. 14 is a side elevational view of an installation system having an installation tool and an assembled nut plate assembly ready for installation, according to one illustrated embodiment.
Figure 15:
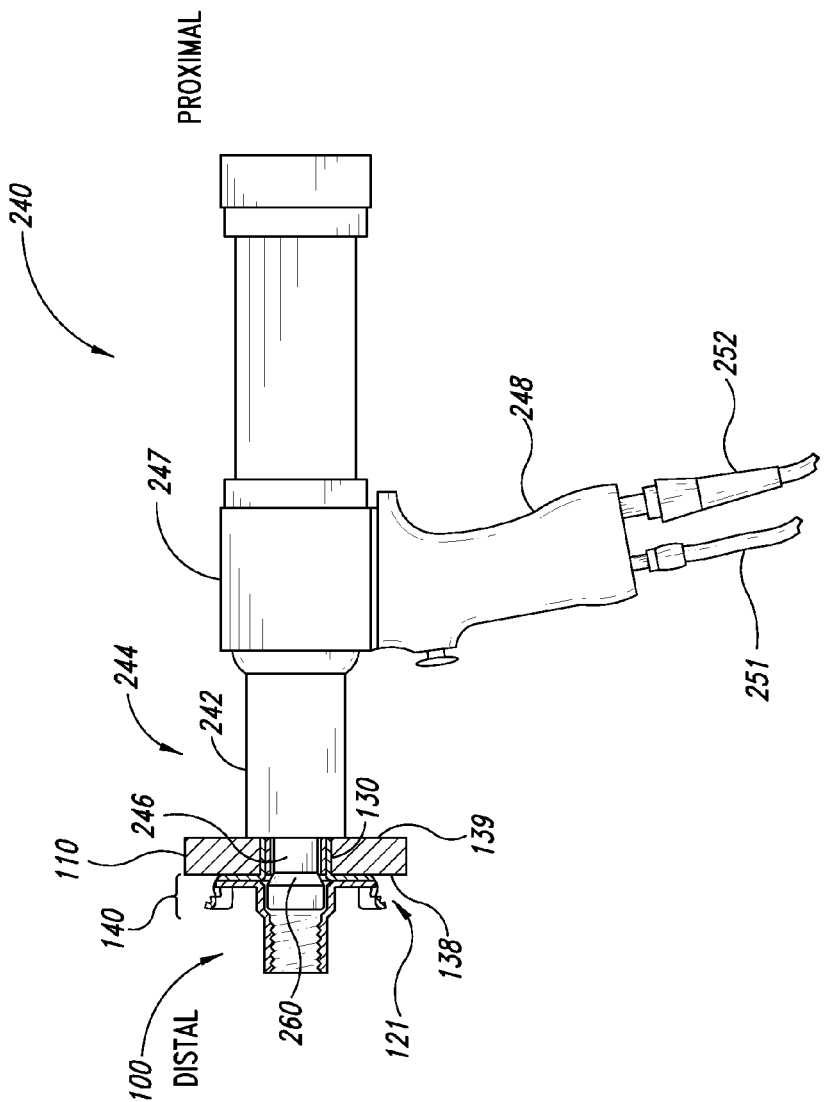
FIG. 15 is a partial cross-sectional view of the installation system of FIG. 14, wherein the nut plate assembly is positioned on a mandrel.

FIGS. 14 and 15 show an installation system 240 used to install the nut plate assembly 100. To install the nut plate assembly 100, a nose cap 242 of an installation tool 244 is placed against the workpiece 110. An expansion mandrel 246 is pulled through the tubular section 130 to expand both the bushing 126 and the tubular body 136. The expansion mandrel 246 can be an elongate member having at least one tapered portion or expanded portion used to expand one or more components. Mandrels can have a one-piece or multi-piece construction.

The installation tool 244 includes a main body 247 that is coupled to a grip 248. The user can manually grasp the grip 248 to comfortably hold and accurately position the installation system 240. The illustrated grip 248 is a pistol grip; however, other types of grips can be utilized. The installation tool 244 can be driven electrically, hydraulically, or pneumatically. In some embodiments, the main body 247 houses a mechanical drive system that drives the expansion mandrel 246, preferably along a predetermined path (e.g., a line of action) in a proximal direction, towards the installer, and/or distal direction, away from the installer. A pair of fluid lines 251, 252 provides pressurized fluid (e.g., pressurized gas, liquid, or combinations thereof) to a drive system that actuates the expansion mandrel 246. One of ordinary skill in the art can select the type of drive system used to achieve the desired motion of the mandrel 246.

FIGS. 14-18 illustrate one process for installation of the nut plate assembly 100. Generally, the tubular section 130 of the retainer assembly 121 can be inserted into the opening 106. The nut retaining section 140 is on the first side 138 of the workpiece 110 and the tubular section 130 extends away from the nut retaining section 140 towards the second side 139 of the workpiece 110. After positioning the retainer assembly 121 the mandrel 246 is moved through the tubular section 130 from the first side 138 to the second side 139 to expand the tubular section 130. Details of the installation process are discussed below.

Figure 16:
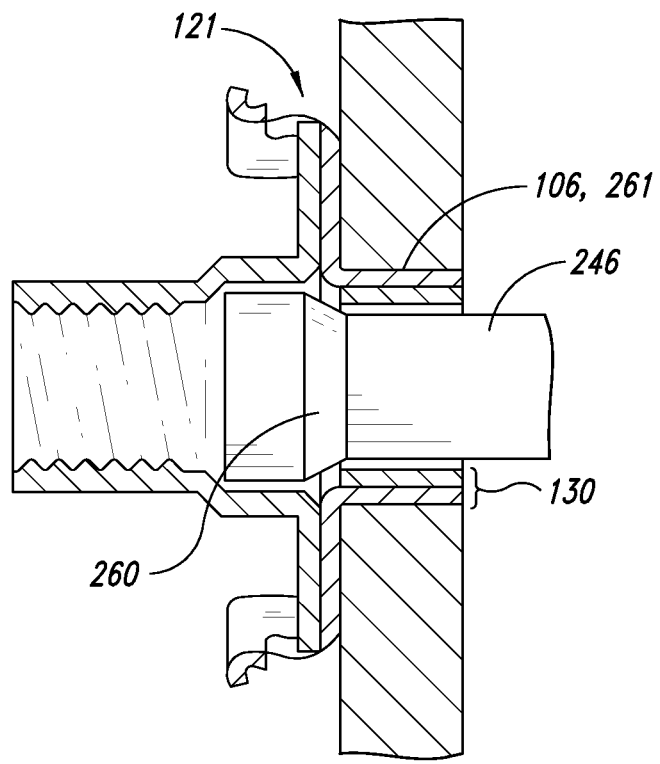
FIG. 16 is a partial cross-sectional view of a portion of an installation system, wherein a mandrel is ready to expand a nut plate assembly, according to one illustrated embodiment.

FIG. 16 shows the mandrel 246 ready to expand the assembled retainer assembly 121. The retainer assembly 121 can be assembled after or before the tubular body 136 is inserted into the workpiece 110. In some embodiments, the bushing 126 is positioned within the tubular body 136 after the body 136 is inserted into the opening 106. In other embodiments, the bushing 126 is inserted into the tubular body 136 and then the assembled bushing 126 and tubular body 136 are inserted together into the opening 106.

Figure 17:
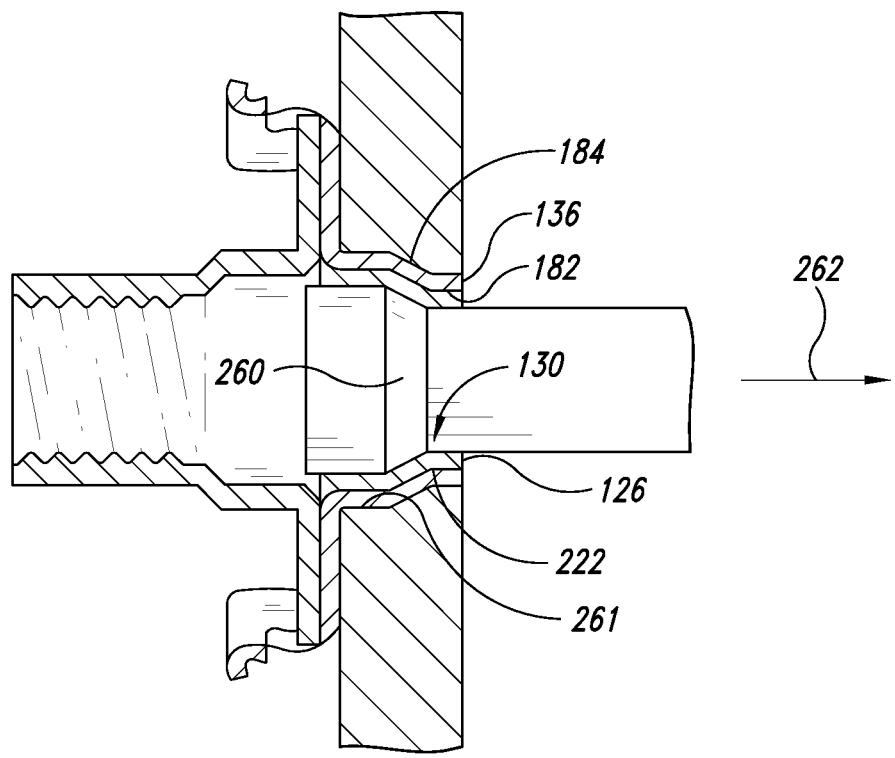
FIG. 17 is a partial cross-sectional view of the installation system of FIG. 16, wherein the mandrel is expanding a multi-piece tubular section of a retainer assembly, according to one illustrated embodiment.

FIG. 17 shows a mandrel tapered section 260 beginning to be pulled through the tubular section 130 in the direction indicated by an arrow 262. As the tapered section 260 progresses through the tubular section 130, the tapered section 260 plastically increases the respective dimensions (e.g., perimeters) of the expanded bushing 126 and tubular body 136. For illustration purposes, the radial expansion of the tubular section 130 is exaggerated. The material of the bushing 126 is radially displaced into the material of the tubular body 136 to form a desired fit between the outer surface 222 of the bushing 126 and the inner surface 182 of the tubular body 136. The material of the tubular body 136 in turn radially displaces the inner surface 261 of the opening 206 to form a desired fit between the outer surface 184 of the tubular body 136 and the inner surface 261. The tapered section 260 cold works the workpiece material surrounding the retainer section 130 to provide a fatigue benefit by creating compressive, residual stresses.

Figure 18:
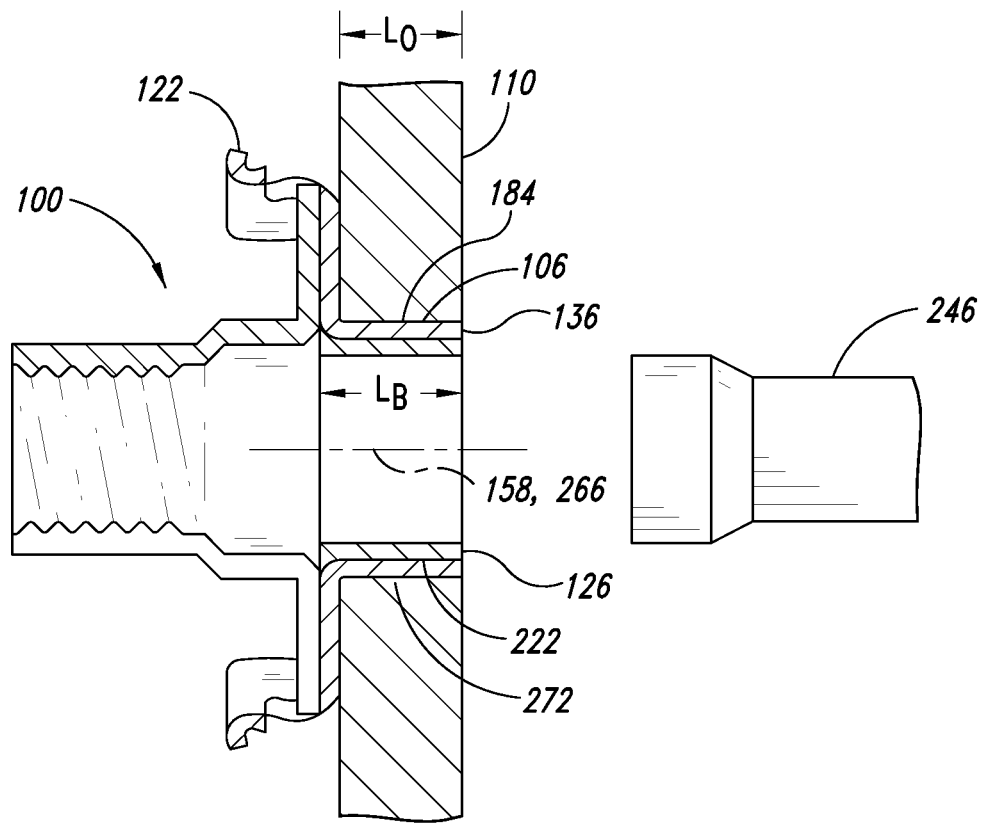
FIG. 18 is a cross-sectional view of the post-expanded multi-piece tubular section of FIG. 17 spaced from the mandrel, according to one illustrated embodiment.

Referring to FIG. 18, the mandrel 246 has cleared the nut plate assembly 100. The radially-expanded bushing 126 has a longitudinal length $L_B$ that is substantially equal to, less than, or greater than a longitudinal length $L_T$ (see FIG. 4) of the tubular body passageway 180. The longitudinal length $L_B$ can be substantially equal to or greater than the longitudinal length $L_T$ to provide an interference fit throughout at least a substantial portion of a longitudinal length $L_O$ of the opening 106. The longitudinal length $L_B$ can be measured along a longitudinal axis 266 of the bushing 126. The longitudinal length $L_T$ can be measured along a longitudinal axis 158 of the tubular body 136.

The illustrated outer surface 184 of the tubular body 136 and the outer surface 222 of the bushing 126 have been radially expanded to provide substantially equal radial expansion throughout at least most of the opening longitudinal length $L_O$. In some embodiments, the entire length $L_O$ of the opening 106 is expanded. Induced compressive stresses in the workpiece material 272 surrounding or adjacent to the opening 106 may improve fatigue performance of the installation. Additionally, the radially-expanded nut retainer 122 of FIG. 18 can be translationally and/or rotationally fixed with respect to the workpiece 110 due to the compressive stresses developed during the expansion process. The bushing 126 can be translationally and/or rotationally fixed with respect to the nut retainer 122. Thus, each component of the nut plate assembly 100 can be fixedly coupled directly or indirectly to the workpiece 110.

The installed bushing 126 can help inhibit, limit, or substantially eliminate relative movement between the workpiece 110 and the retainer assembly 121, even if another component coupled to the retainer assembly 121 via the nut member 120 is subjected to various loading conditions, such as axial loads or torsional loads, including static and cyclic loading. The bushing 126 can prop the tubular body 136 against the workpiece 110.

The mandrel 246 can be reused or discarded. If reused, the mandrel 246 can be returned to a manufacturer to be reassembled into another nut plate assembly 100. The manufacturer of the nut plate assembly may or may not provide a refund or other incentive to encourage the return of mandrels. In some embodiments, the mandrel 246 is disposable.

Figure 19:
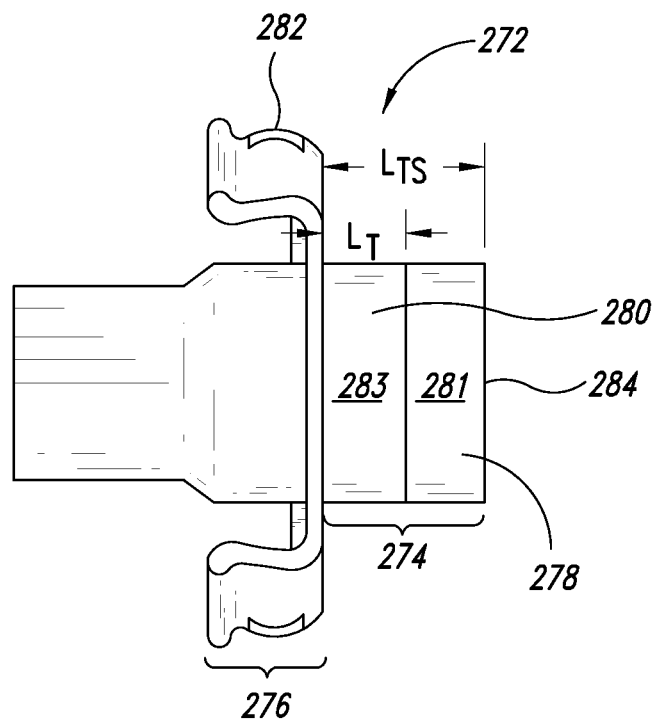
FIG. 19 is a side elevational view of a nut plate assembly that has a multi-piece tubular section for expanding an opening of a workpiece, according to one illustrated embodiment.

FIG. 19 shows a nut plate assembly 272 that includes a tubular section 274 and a nut retaining section 276. Components of the nut plate assembly 272 can be selected to provide different grip lengths. Accordingly, the nut plate assembly 272 can be installed into a wide range of workpieces, including thin sheets, thick plates, and the like, and can be generally similar to the nut plate assembly 100 discussed in connection with FIGS. 1-18, except as further detailed below.

A longitudinal length $L_{TS}$ of the tubular section 274 can be adjusted based on the thickness of a workpiece. Expandable members of different lengths can be used to increase or decrease the longitudinal length $L_{TS}$ of the tubular section 274. The tubular section 274 of FIGS. 19 and 20 has an outer surface 278, which is defined by a tubular body 280 of a nut retainer 282 and an expandable member 284 in the form of a bushing. The length of the exposed portion of the bushing 284 can be selected based on the length $L_O$ of the opening 287 of the workpiece 289. Thus, the illustrated nut retainer 282 can be installed into a wide range of workpieces having different thicknesses.

Figure 20:
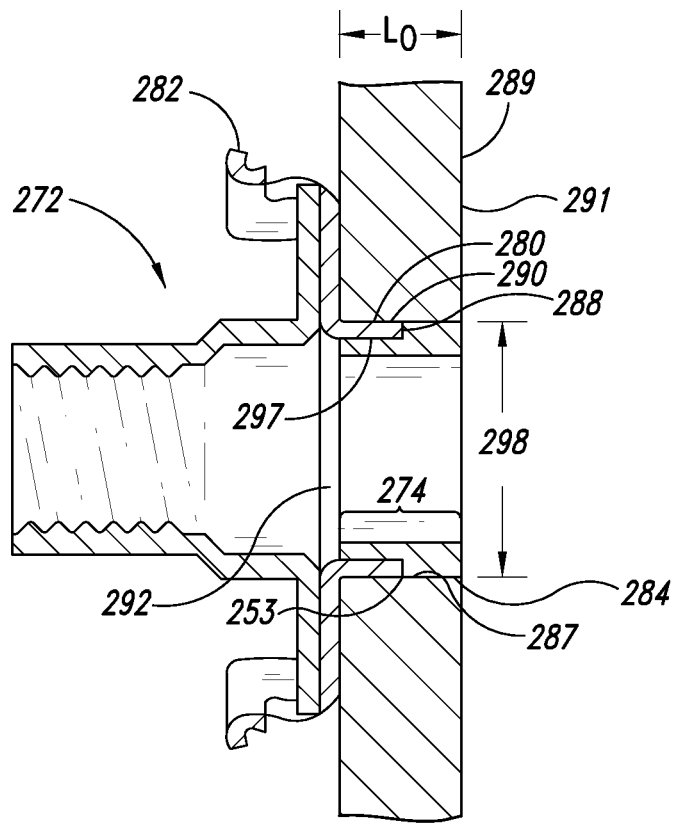
FIG. 20 is a cross-sectional view of the nut plate assembly of FIG. 19 in a workpiece, according to one illustrated embodiment.
Figure 21:
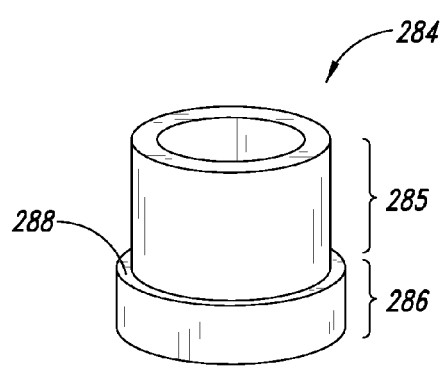
FIG. 21 is an isometric view of an expandable member, according to one illustrated embodiment.
Figure 22:
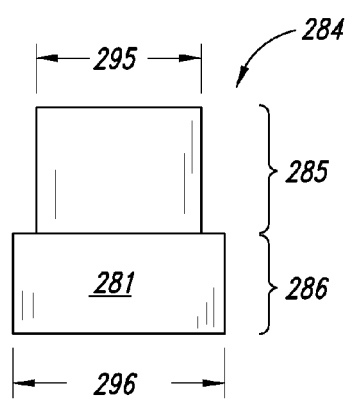
FIG. 22 is a side elevational view of the expandable member of FIG. 21.
Figure 23:
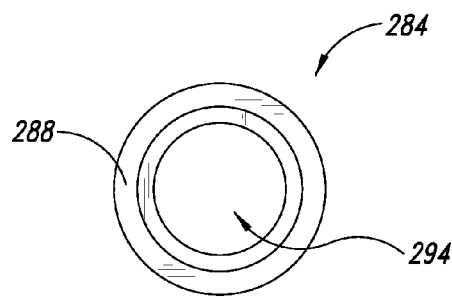
FIG. 23 is a top plan view of the expandable member of FIG. 21.

Referring to FIGS. 21-23, the bushing 284 includes a first section 285 for placement in the tubular body 280 of the retainer 282 and a second section 286 for physically contacting and expanding the workpiece 289. The first section 285 and the second section 286 cooperate to define a bushing passageway 294. The bushing 284 includes a shoulder 288, illustrated as a stepped diameter, between the first section 285 and the second section 286. As shown in FIG. 20, the shoulder 288 contacts an end 290 of the tubular body 280 when the first section 285 is positioned along a body passageway 292 of the tubular body 280.

The first section 285 has a longitudinal length that is substantially equal to a length of the nut retainer tubular body 280. The second section 286 has a longitudinal length that is substantially equal to a length of a section of the workpiece opening 287 extending between the end 290 of the tubular body 280 and an outer face 291 of the workpiece 289. The illustrated second section 286 of FIG. 20 protrudes from the end 290 and through the opening 287 to the face 291.

Referring to FIG. 22, the first section 285 includes a first outer perimeter 295, and the second section 286 includes a second outer perimeter 296 that is greater than the first outer perimeter 295. In some embodiments, the first outer perimeter 295 is generally equal to or slightly less than an inner perimeter of the tubular body 280. At least a portion of the first section 285 can also have a transverse profile that is substantially geometrically congruent to a transverse profile of at least a portion of the tubular body 280, before, and/or after the installation process. In some embodiments, the first section 285 has a transverse profile that is slightly smaller than the transverse profile of the tubular body 280 such that a slight interference fit is formed between the first section 285 and the tubular body 280 before expansion. The first section 285 and tubular body 280 can then be simultaneously expanded.

At least a portion of the second section 286 can have a transverse profile that is substantially geometrically congruent to a transverse profile of at least a portion of the opening 287 before and/or after the installation process. In some embodiments, the second section 286 has a transverse profile that is slightly smaller than the transverse profile of the opening 287 such that a slight interference fit is formed between the second section 286 and the opening 287 before expansion. The second section 286 can then be expanded to cause corresponding expansion of the opening 287.

To install the nut plate assembly 272 of FIG. 20, the tubular section 274 is expanded to form a first interference fit between the first section 285 of the bushing 284 and the tubular body 280 and a second interference fit between the second section 286 of the bushing 284 and the workpiece 289. The tubular body 280 is expanded a sufficient amount to form an interference fit with the workpiece 289. Thus, the tubular body 280 and the bushing 284 are fixed to the workpiece 289 via interference fits.

In some embodiments, both the outer surface 283 of the tubular body 280 of FIG. 19 and the outer surface 281 of the second section 286 can be radially expanded to provide substantially equal radial expansion throughout at least most of the longitudinal length of the opening 287. In some embodiments, the entire longitudinal length of the opening 287 is radially expanded to induce compressive stresses in the material of the workpiece 289 physically contacting the tubular section 274.

FIG. 24 shows a mandrel assembly 300 for expanding the nut plate assemblies disclosed herein. The mandrel assembly 300 includes a mandrel 301 having an engagement portion 302, a tapered region 304, a receiving surface 306, and a collar 308. The engagement portion 302 permits the mandrel 301 to be connected to an installation tool. The tapered region 304 includes a minimum perimeter portion 310, a maximum perimeter portion 312, and a transition perimeter portion 313 extending therebetween. The tapered region 304 is positioned downstream, as indicated by the arrow 314, from the engagement portion 302 and operates to radially expand components. The illustrated maximum perimeter portion 312 of the mandrel 301 is larger than the inner perimeter 188 of the retainer 122.

A uniform perimeter region 316 may be positioned adjacent to the maximum perimeter portion 312 of the tapered region 304. The uniform perimeter region 316 can be useful during the manufacturing of the mandrel assembly 301. In some embodiments, the mandrel 301 may not have a uniform perimeter region in order to reduce the axial length of the mandrel 301. The maximum perimeter portion 312, for example, can extend from the receiving surface 306.

Figure 26:
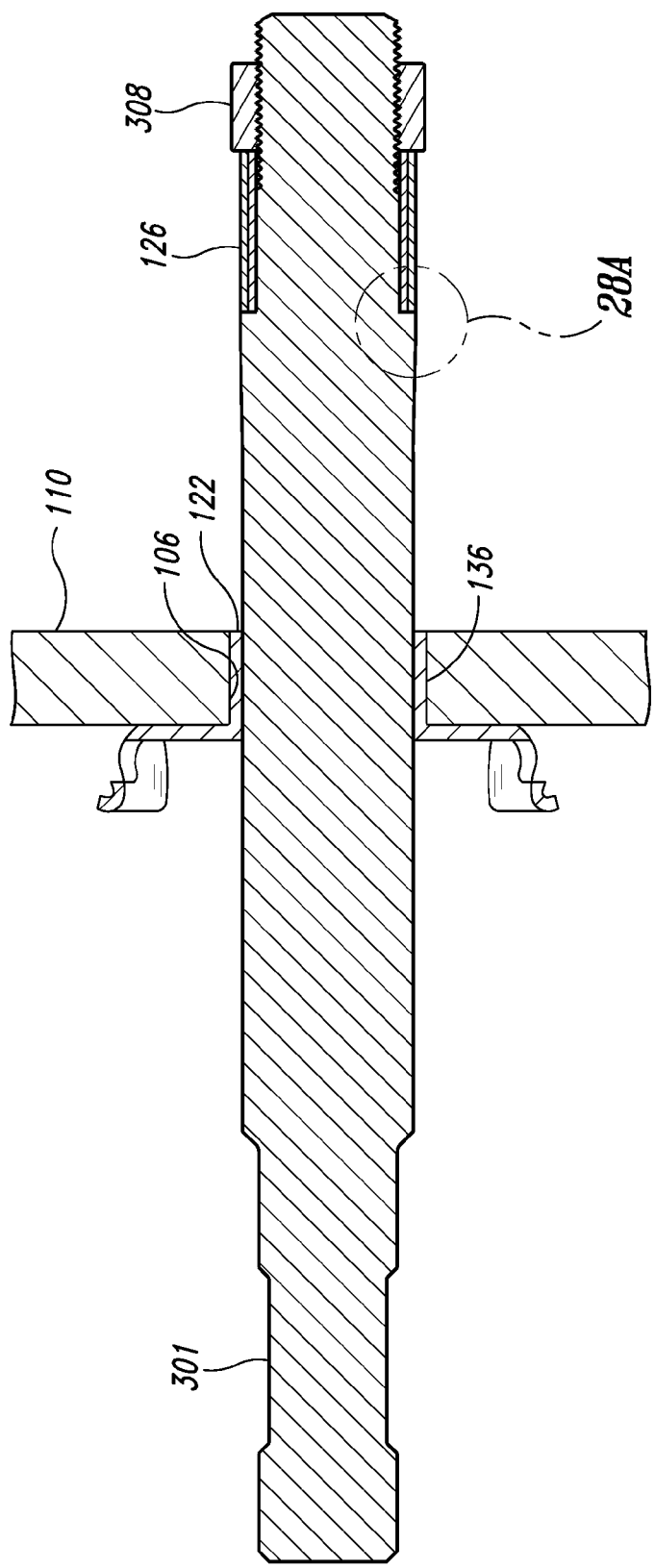
FIG. 26 is a cross-sectional view of the mandrel assembly of FIG. 24 operating to install a nut plate assembly into an opening of a structural workpiece.

The receiving surface 306 is positioned near the tapered region 304 and includes an outer perimeter 317 sized to receive an expandable member, such as the bushing 126 or bushing 284 described above. The outer perimeter 317 can be sized to receive (e.g., loosely receive with a clearance fit) the expandable member so as to minimize, limit, or substantially prevent damage to the inner surface of the member. For example, when the bushing 126 of FIG. 26 is positioned along the receiving surface 306, the bushing 126 is axially fixed with respect to the mandrel 301. The bushing 126 can be pulled towards the retainer 122 as shown in FIG. 27.

The outer perimeter of the bushing 126 is sized to be equal to (e.g., maximum tolerance conditions) or at least slightly smaller than the inner perimeter 188 of the radially-expanded retainer 122. This relative sizing allows the bushing 126 to be passed (e.g., pulled, pushed, or both) into the retainer 122 such that the bushing 126 props open the tubular body 136. In some embodiments, the bushing 126 can be inserted into the tubular body 136 without damaging the bushing 126. The relative size of the radially expanded tubular body 136 can also permit the bushing 126 to be passed into the radially expanded tubular body 136 so that the tubular body 136 can contract (e.g., collapse, constrict, and the like) about the bushing 126. For example, the tubular body 136 can elastically contract to form an interference fit with the bushing 126, which both supports and limits the radial contraction of the tubular body 136.

Figure 28B:
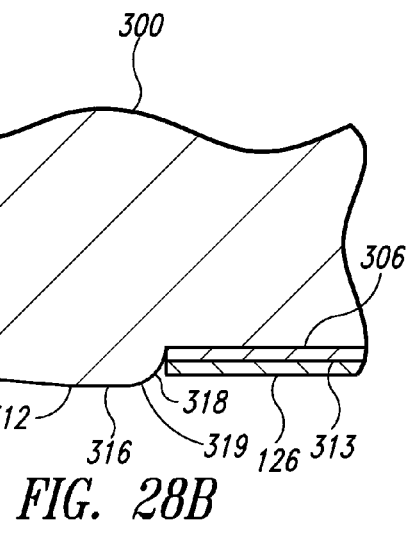

Referring to FIG. 28A, a shoulder 318 can form the transition between the maximum perimeter portion 312 or the uniform perimeter region 316 and the receiving surface 306. The illustrated shoulder 318 is in the form of an annular step. Other shoulder configurations are also possible.

Figure 28C:
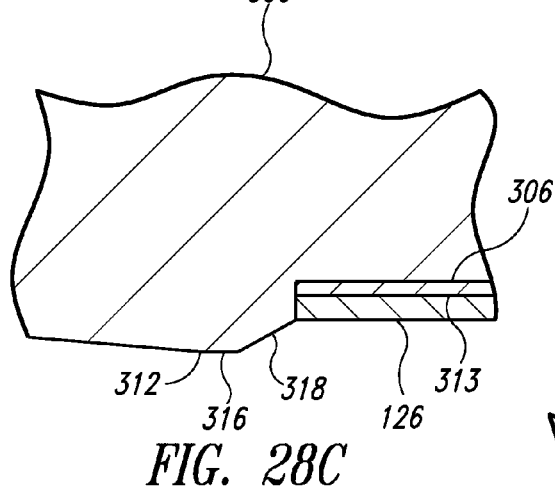
Figure 28D:
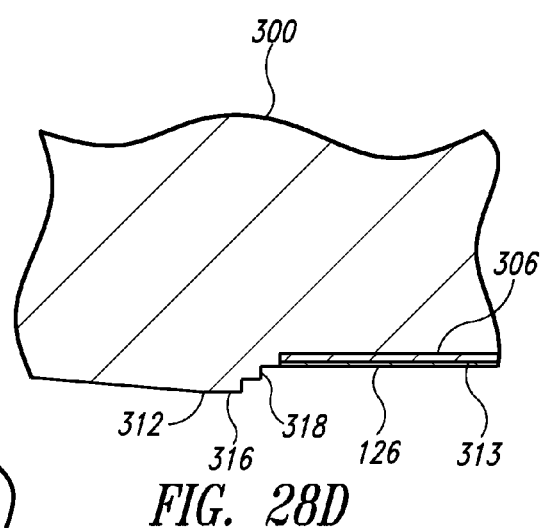
Figure 28E:
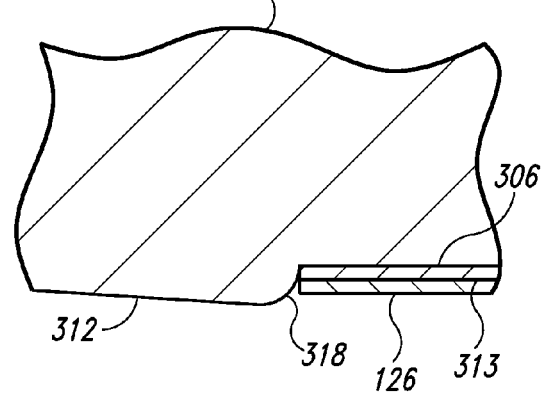

FIGS. 28B-E show shoulders used to generate somewhat uniform distributions of residual stresses in the tubular body 136 of the retainer 122. The shoulder 318 of FIG. 28B defines an arcuate outer surface 319 extending from the uniform perimeter region 316 to the receiving surface 306. The tubular body 136 of the retainer 122 can cam easily over the shoulder 318 and onto the bushing 126. FIG. 28C shows a down-tapered shoulder 318. The rate of taper of the shoulder 318 can be increased or decreased to decrease or increase the distance between the bushing 126 and the uniform perimeter region 316. The shape, size, and position of the shoulder 318 can be selected based on the desired interaction between the mandrel 301 and the retainer 122. FIG. 28D shows the shoulder 318 comprising a plurality of steps from the uniform perimeter region 316 to the receiving surface 306. FIG. 28E shows the shoulder 318 connecting the maximum perimeter portion 312 to the receiving surface 306.

The height of the shoulder 318 can be selected based on the configuration of the bushing 126 and the installation process. FIG. 28A shows the shoulder 318 with a height H that is generally equal to the wall thickness T of the bushing 126. In some embodiments, the wall thickness T of the bushing 126 is less than the height H of the shoulder 318 of the mandrel 301. In some embodiments, at least a portion of the wall thickness T of the bushing 126 is greater than or equal to the height H of the shoulder 318. These relative sizes permit the bushing 126 to be slid into the radially-expanded tubular body 136 during installation without appreciably damaging these components.

Referring to FIGS. 28B-28E, the bushing 126 can include an engagement portion 313 configured to engage another component. The engagement portion 313 can be a layer (e.g., a coating or plating) of a wear resistant material, lubricant (e.g., an anti-fretting lubricant), or anti-fretting material that is applied to the bushing 126. The engagement portion 313 can reduce friction, for example friction between the bushing 126 and another component (not shown) that may move relative to the bushing 126.

One type of engagement portion 313 may be a silver coating applied for wear purposes that may include an amount of silver iodide to enhance lubricity of the silver coating. Alternatively or additionally, the portion 313 can be formed of a polymer, such as synthetic resin lubricants like polytetrafluoroethylene (PTFE), TEFLON®, nylon, NEDOX® CR+, blends, mixtures, and combinations thereof. These materials can be generally referred to as "soft" because they are generally softer than the main bushing material (e.g., steel). Thus, these relatively soft engagement portions are generally more prone to being damaged during the installation process.

Referring again to FIGS. 24 and 25, the collar 308 is positioned downstream from the receiving surface 306 and engages the mandrel 301 to position the bushing 126 during the installation process. The receiving surface 306 is interposed between the shoulder 318 and the collar 308. As shown in the embodiment of FIG. 25, the collar 308 can serve as a stop to position the bushing 126 at least proximate to the shoulder 318 of the mandrel 301.

The illustrated collar 308 includes internal threads that engage a threaded region 320 of the mandrel 301. The collar 308 can be rotated about the threaded region 320 to adjust the distance between the shoulder 318 and the face 309 of the collar 308 for contacting the bushing 126. The collar 308, once placed on the mandrel 301, may be torqued down to provide at least a slight compression force on the bushing 126 depending on the compressive strength capacity of the bushing 126. In this manner, the collar 308 and shoulder 318 cooperate to limit or substantially prevent axial movement of the bushing 126 along the mandrel 301.

The various embodiments described above can be combined to provide further embodiments. All of the above U.S. patents, patent applications and publications referred to in this specification, as well as U.S. Pat. Nos. 3,566,662; 3,892,121; 4,187,708; 4,423,619; 4,425,780; 4,471,643; 4,524,600; 4,557,033; 4,809,420; 4,885,829; 4,934,170; 5,083,363; 5,096,349; 5,405,228; 5,245,743; 5,103,548; 5,127,254; 5,305,627; 5,341,559; 5,380,136; and 5,433,100; and U.S. patent application Ser. Nos. 09/603,857; 10/726,809; 10/619,226; 10/633,294, and 11/653,196 are incorporated herein by reference. Aspects can be modified, if necessary or desired, to employ devices, features, elements (e.g., fasteners, bushings, mandrels, and other types of expandable members), and concepts of the various patents, applications, and publications to provide yet further embodiments. For example, the nut plate assemblies disclosed herein can be installed using the mandrels or other installation tools disclosed in the incorporated patents and applications.

From the foregoing it will be appreciated that, although specific embodiments of the invention have been described herein for purposes of illustration, various modifications may be made without deviating from the spirit and scope of the invention. Accordingly, the invention is not limited except as by the appended claims.

What is claimed is:

1. An assembly for retaining a nut member, the assembly comprising:
   a nut retainer including a nut retaining section and an expandable tubular body connected to the nut retaining section, the nut retaining section including an abutment portion configured to contact a workpiece when the expandable tubular body is positioned in an opening of the workpiece, the expandable tubular body including a tubular body inner surface surrounding a tubular body passageway and defining a tubular body inner perimeter; and
   a bushing including a bushing outer surface defining a first outer perimeter and a bushing inner surface at least partially surrounding a bushing passageway, the first outer perimeter substantially equal to or smaller than the tubular body inner perimeter, the bushing passageway adapted to receive a mandrel capable of radially expanding the bushing and the tubular body when the tubular body circumferentially surrounds the bushing so as to form a first interference fit between the tubular body and the workpiece and a second interference fit between the bushing outer surface and the tubular body inner surface.

2. The assembly of claim 1, further comprising:
a nut member configured and dimensioned to couple to the nut retaining section, the nut member being adapted to receive and retain another component.

3. The assembly of claim 2, wherein the nut member is axially and rotationally fixable to the nut retaining section.

4. The assembly of claim 1, wherein the bushing has a longitudinal length that is substantially equal to a longitudinal length of the tubular body.

5. The assembly of claim 1, wherein the bushing comprises a first section and a second section that cooperate to define the bushing passageway, the first section includes the first outer perimeter, the second section includes a second outer perimeter that is larger than the first outer perimeter, the second outer perimeter and an outer perimeter of the tubular body form an outer surface for expanding substantially the entire opening when the first section is within the tubular body.

6. The assembly of claim 1, wherein the bushing has a first section, a second section adapted to expand a portion of the opening of the workpiece, and a shoulder between the first section and the second section, the shoulder is configured to contact an end of the tubular body when the first section is positioned along the tubular body passageway.

7. The assembly of claim 6, wherein at least a portion of an outer surface of the second section has a transverse profile that is substantially geometrically congruent to a transverse profile of at least a portion of a body outer surface of the tubular body.

8. An installation comprising:
a workpiece including a first side, a second side, and an opening extending between the first side and the second side, the opening having a longitudinal length; and
a retainer assembly comprising a tubular section having been expanded to provide radial expansion along at least most of the longitudinal length of the opening of the workpiece, the retainer assembly further comprising
a nut,
a retainer including a nut retaining section and an expanded tubular body, the nut retaining section adapted to receive and retain the nut and to physically contact the first side of the workpeice, the expanded tubular body extending through at least a portion of the opening and having a passageway, and
an expanded bushing extending through the passageway of the tubular body and having a bushing passageway, wherein the tubular section of the retainer assembly includes the tubular body of the retainer and the bushing.

9. The installation of claim 8, wherein the bushing has a longitudinal length that is substantially equal to or larger than the longitudinal length of the opening of the workpiece.

10. The installation of claim 8, wherein the bushing includes a first section and a second section that cooperate to define the bushing passageway, the first section extends through the passageway of the tubular body, the second section is adjacent to the tubular body and protrudes radially outward beyond an inner surface of the expanded tubular body, a first interference fit is between the first section and the inner surface of the tubular body, and a second interference fit is between the second section and the workpiece.

11. The installation of claim 8, wherein the bushing has a first section and second section, the first section is surrounded by the expanded tubular body, the second section protrudes from the tubular body and through a portion of the opening located between the tubular body and the second side of the workpiece.

12. The installation of claim 11, wherein both an outer surface of the tubular body and an outer surface of the second section have been radially expanded to provide substantially uniform radial expansion throughout at least most of the longitudinal length of the opening.

13. The installation of claim 11, wherein the second section of the bushing has an outer surface that is substantially geometrically congruent to an outer surface of the tubular body.

14. The installation of claim 8, further comprising:
a first interference fit between an outer surface of the tubular body and an inner surface of the workpiece, the inner surface of the workpiece defining the opening; and
a second interference fit between an inner surface of the tubular body and an outer surface of the expanded bushing.

15. The installation of claim 8, wherein the opening has been radially displaced along substantially all of the longitudinal length of the opening because of sufficient radial displacement along substantially all of a longitudinal length of the bushing.

16. A method of installation comprising:
positioning a tubular body of a nut retainer in an opening of a workpiece such that a nut retaining section of the nut retainer is on a first side of the workpiece and the tubular body extends away from the nut retaining section towards a second side of the workpiece opposing the first side, the nut retaining section is being adapted to receive and hold a nut member;
positioning a bushing in a passageway of the tubular body of the nut retainer; and
expanding the bushing using a mandrel to cause radial expansion of both the tubular body and a surface of the workpiece that defines the opening.

17. The method of claim 16, further comprising:
coupling a nut member to the nut retaining section after expanding the bushing.

18. The method of claim 16, wherein expanding the bushing further comprises:
expanding a first section of the bushing to cause expansion of both the tubular body surrounding the first section and a first portion of the opening; and
expanding a second section of the bushing to cause expansion of a second portion of the opening, the second portion of the opening separates the tubular body and the second side of the workpiece.

19. The method of claim 16, wherein expanding the bushing further comprises:
forming a first interference fit between an outer surface of the tubular body and an inner surface of the workpiece, the inner surface of the workpiece defining the opening; and
forming a second interference fit between an inner surface of the tubular body and a first outer surface of the bushing.

20. The method of claim 19, further comprising:
forming a third interference fit between a second outer surface of the bushing and the inner surface of the workpiece.

* * * * *